(12) United States Patent
Fuchs et al.

(10) Patent No.: US 8,033,952 B2
(45) Date of Patent: Oct. 11, 2011

(54) FULL-TOROIDAL CONTINUOUSLY VARIABLE TRANSMISSION

(75) Inventors: Robert Fuchs, Osaka (JP); Yasuhiko Hasuda, Kashihara (JP)

(73) Assignee: JTEKT Corporation, Osaka (JP)

( * ) Notice: Subject to any disclaimer, the term of this patent is extended or adjusted under 35 U.S.C. 154(b) by 1017 days.

(21) Appl. No.: 11/919,250

(22) PCT Filed: Apr. 28, 2006

(86) PCT No.: PCT/JP2006/309031
§ 371 (c)(1),
(2), (4) Date: Oct. 25, 2007

(87) PCT Pub. No.: WO2006/118270
PCT Pub. Date: Nov. 9, 2006

(65) Prior Publication Data
US 2009/0325755 A1    Dec. 31, 2009

(30) Foreign Application Priority Data
Apr. 28, 2005 (JP) ................... 2005-132607

(51) Int. Cl.
*F16H 15/38* (2006.01)
(52) U.S. Cl. .................. 476/2; 476/10; 476/40
(58) Field of Classification Search .......... 476/2, 3, 476/9, 10, 40, 42, 46
See application file for complete search history.

(56) References Cited

U.S. PATENT DOCUMENTS
3,142,190 A * 7/1964 Kelsey et al. ............. 476/10

FOREIGN PATENT DOCUMENTS
| JP | 1-250657 | 10/1989 |
|---|---|---|
| JP | 7-35110 | 2/1995 |
| JP | 2001-074114 | 3/2001 |
| JP | 2002-174315 | 6/2002 |
| JP | 2003-130164 | 5/2003 |
| JP | 2004-278740 | 10/2004 |
| WO | WO-91/14116 | 9/1991 |
| WO | WO-2004/063602 | 7/2004 |

* cited by examiner

*Primary Examiner* — William C Joyce
(74) *Attorney, Agent, or Firm* — Rabin & Berdo, PC

(57) ABSTRACT

A full-toroidal continuously variable transmission has a hydraulic actuator (20) for applying pressing force to a pair of disks (5, 15) through a roller (17). The hydraulic actuator (20) includes first and second oil chambers (23, 24). The pressing force of the hydraulic actuator (20) is produced by a pressure difference between the oil chambers (23, 24). A directional control valve (29; 29P; 29Q) connects a hydraulic pressure source (25; 25P; 25Q) to either of the oil chambers, and an oil tank (26) is connected to the other oil chamber. Each corresponding an intermediate section (27a; 27Pa, 27Qa) of a feeding path (27, 27P, 27Q) and intermediate section (28a; 28Pa; 28Qa) of a discharge path (28; 28P; 28Q) are connected by a communicational path (32; 32P; 32Q). A check valve (33; 33P; 33Q) for permitting a flow of operation oil only to the feeding path side (27, 27P, 27Q) is provided in the communication path (32; 32P; 32Q). A flow restriction (34; 34P; 34Q) is placed on a downstream side of the intermediate section (28a; 28Pa; 28Qa) of the discharge path (28; 28P; 28Q).

5 Claims, 7 Drawing Sheets

FULL-TOROIDAL CONTINUOUSLY VARIABLE TRANSMISSION

TECHNICAL FIELD

The present invention relates to a full-toroidal continuously variable transmission used as a transmission for an automobile, for example.

BACKGROUND ART

In a variator serving as a principal part of a full-toroidal continuously variable transmission, an input disk and an output disk each having a concaved track surface are arranged such that the track surfaces are opposed to each other, and a plurality of rollers are arranged between both the disks (see Japanese Unexamined Patent Publication Nos. 2002-174315, 2004-278740, and 2001-74114, for example).

A terminal load due to the hydraulic pressure of traction oil is applied in an axial direction of each of the disks. This causes the rollers to be press-contacted to the track surface of each of the disks through an oil film. The input disk is attached to an input shaft whose rotation is driven by a driving source of a vehicle, for example, an engine. The rotation of the input shaft transmits torque to the output disk from the input disk through the rollers.

The axis of rotation of the rollers is inclined depending on necessary torque so that transmission is performed in a stepless manner (see International Patent Application Publication No. WO 91/14116, for example). The axis of rotation of the rollers is supported by a carriage serving as a supporting member. There is provided a hydraulic cylinder for applying a driving force in a traveling direction of the carriage, and thus adjusting a biasing force of the rollers against both the disks.

As disclosed in Japanese Unexamined Patent Publication Nos. 2002-174315 and JP 2004-278740, the hydraulic cylinder has a pair of oil chamber. Oil from a hydraulic pump is introduced into one of the oil chambers, and oil in the other oil chamber is discharged into a tank. The driving force in the traveling direction is produced on the basis of a differential pressure between the oil chambers.

In the full-toroidal continuously variable transmission, when the torque is transmitted from the input disk to the output disk, a traction force is produced between the rollers and each of the disks. The end load and the driving force of the carriage are set such that the traction force and the driving force of the carriage are balanced under a predetermined traction coefficient.

In recent years, there has been a request to miniaturize a full-toroidal continuous variable transmission. For this purpose, it is preferable that a hydraulic pump for biasing rollers is miniaturized. When a small-sized hydraulic pump is used, however, a hydraulic cylinder cannot quickly feed hydraulic oil corresponding to a rapid transmission. As a result, responsiveness at the time of transmission is restricted.

DISCLOSURE OF INVENTION

An object of the present invention is to provide a toroidal continuously variable transmission being small in size and having good responsiveness at the time of transmission.

In order to attain the above-mentioned object, a preferred aspect of the present invention comprises: a pair of disks opposed to each other; a roller arranged in a toroidal cavity formed between the disks for transmitting torque between the disks; a carriage for rotatably supporting the roller; a hydraulic actuator for applying a pressing force against the pair of disks to the roller through the carriage; and a hydraulic circuit connected to the hydraulic actuator. The hydraulic actuator comprises first and second oil chambers. The pressing force is produced by a difference in pressure between the first and second oil chambers.

The hydraulic circuit comprises at least one feeding path communicating with a hydraulic pressure source, at least one discharge path communicating with an oil tank, and at least one communication path for communicating intermediate sections of the feeding path and the discharge path that correspond to each other. Further, the hydraulic circuit comprises at least one directional control valve for alternatively switching a first state where the first oil chamber and the second oil chamber are respectively connected to the feeding path and the discharge path and a second state where the first oil chamber and the second oil chamber are respectively connected to the discharge path and the feeding path. Furthermore, the hydraulic circuit comprises at least one check valve arranged in the communication path for allowing only a circulation of hydraulic oil to the corresponding feeding path, and at least one flow restriction provided in the discharge path. The flow restriction is arranged on a downstream side of the intermediate section of the discharge path.

When the second oil chamber is an oil chamber on the discharge side, for example, the hydraulic oil is fed into the first oil chamber from the feeding path, while the hydraulic oil discharged from the second oil chamber to the discharge path is returned to the feeding path through the communication path and is introduced into the first oil chamber.

As a result, the hydraulic oil can be quickly fed into the first oil chamber. Consequently, a biasing force of the roller can be instantaneously adjusted, so that the transmission ratio can be changed as quickly as possible. Further, a hydraulic pump, for example, serving as the hydraulic pressure source can be miniaturized, and thus the full-toroidal continuously variable transmission can be miniaturized.

Furthermore, the pressure of hydraulic oil in a portion of the discharge path positioned on the upstream side of the flow restriction can be increased. Thus, the hydraulic oil can be amply fed into the intermediate section of the feeding path from the intermediate section of the discharge path through the communication path. The flow restriction may be a fixed flow restriction, a variable flow restriction, or may be contained in a pressure control valve and a flow control valve.

When only one directional control valve for alternatively connecting either one of the feeding path and the discharge path to the first oil chamber and alternatively connecting the other to the second oil chamber is provided as the at least one directional control valve, the configuration can be simplified.

There is a case where the at least one feeding path includes first and second feeding paths corresponding respectively to the first and second oil chambers, the at least one discharge path includes first and second discharge paths corresponding respectively to the first and second oil chambers, the at least one directional control valve includes a first directional control valve for alternatively connecting the first oil chamber to either one of the first feeding path and the first discharge path and a second directional control valve for alternatively connecting the second oil chamber to either one of the second feeding path and the second discharge path, the at least one communication path includes a first communication path for connecting an intermediate section of the first feeding path to an intermediate section of the second discharge path and a second communication path for connecting an intermediate section of the second feeding path to an intermediate section of the first discharge path, the at least one check valve includes a first check valve provided in the first communication path for allowing only a circulation of hydraulic oil to the first feeding path and a second check valve provided in the second communication path for allowing only a circulation of hydraulic oil to the second feeding path, the at least one flow restriction includes a first flow restriction provided in the first discharge path and a second flow restriction provided in the second flow restriction, the first flow restriction is arranged on a downstream side of the intermediate section of the first discharge path, and the second flow restriction is arranged on a downstream side of the intermediate section of the second discharge path.

When the second oil chamber is an oil chamber on the discharge side, for example, the hydraulic oil is fed into the first oil chamber from the first feeding path, while the hydraulic oil discharged from the second oil chamber to the second discharge path is introduced into the first oil chamber through the intermediate section of the second discharge path, the first communication path, and the intermediate section of the first feeding path. As a result, the hydraulic oil can be quickly fed into the first oil chamber. Consequently, a biasing force of the roller can be instantaneously adjusted, so that the transmission ratio can be changed as quickly as possible.

BEST MODE FOR CARRYING OUT THE INVENTION

Figure 1:
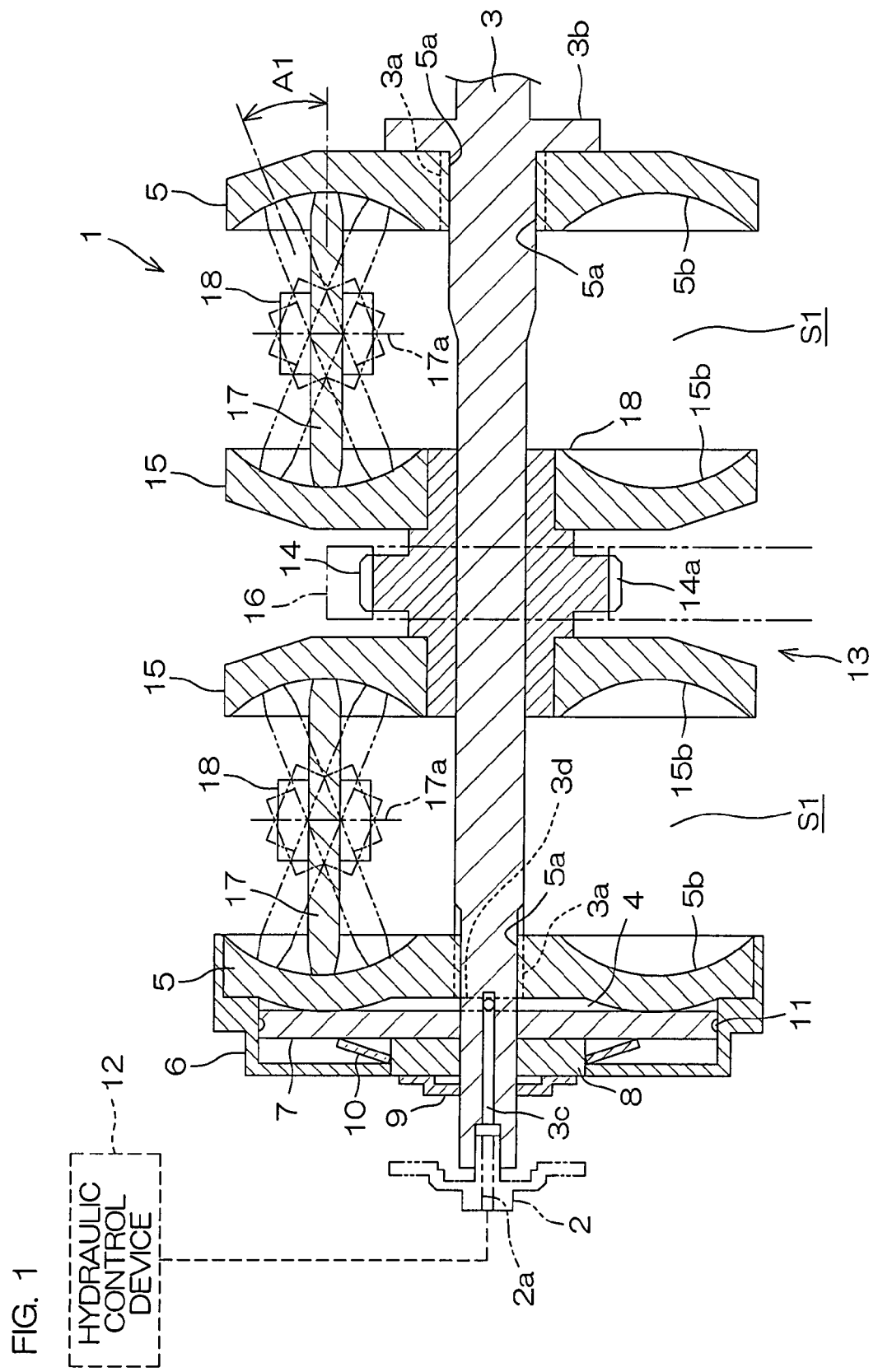
FIG. 1 is a schematic sectional view showing the schematic configuration of a full-toroidal continuously variable transmission according to an embodiment of the present invention.

Preferred embodiments of the present invention will be described with reference to the attached drawings. FIG. 1 is a schematic view showing a variator in a full-toroidal continuously variable transmission according to an embodiment of the present invention. In the full-toroidal continuously variable transmission, the variator 1 is provided with an input shaft 3 whose rotation is driven by a power source of a vehicle, and input disks 5 are respectively supported on the vicinities of both ends of the input shaft 3.

A concaved track surface 5b is formed on one side surface of each of the input disks 5. A spline hole 5a in which a plurality of grooves are cut is formed on the inner periphery of each of the input disks 5. The input disk 5 and the input shaft 3 are assembled so as to be integrally rotatable by coupling the spline hole 5a in the input disk 5 to a spline shaft 3a provided for the input shaft 3. In FIG. 1, from a state shown in FIG. 1, the rightward movement of the input disk 5 on the right side is regulated by a locking section 3b provided integrally with the input shaft 3. That is, the axial movement of the input disk 5 towards the input shaft 3 is regulated.

A rear surface that is opposite to the track surface 5b of the input disk 5 on the left side is provided with a casing 6 for covering the whole rear surface and a backup plate 7 inscribed to the inner periphery of the casing 6. The rear surface is provided with a locking ring 8 and a snap ring 9 fixed to the input shaft 3 for regulating the axially leftward movement of the output disk 5 and the backup plate 7, and a washer 10 mounted on the outer periphery of the locking ring 8 for applying pressure to the backup plate 7.

An O ring 11 is mounted on the outer periphery of the backup plate 7. A space between an outer peripheral surface of the input shaft 3 and an inner peripheral surface of the casing 6 is partitioned by the rear surface of the input disk 5 and the backup plate 7 to form an oil chamber 4 around the input shaft 3. That is, a hydraulic cylinder device is configured using the casing 6 and the backup plate 7 as a cylinder and using the input disk 5 as a piston.

The oil chamber 4 communicates with an oil path 3d extending in a radial direction of the input shaft 3 from an end of an oil path 3c provided along the axis of the input shaft 3. An end member 2 is inserted into the end of the input shaft 3, and an oil path 2a is provided inside the end member 2. The oil path 2a is connected to a hydraulic control device 12. The oil path 3c communicates with the oil path 2a inside the end member 2. An output section 13 in the variator 1 is supported on the input shaft 3 so as to be relatively rotatable in an intermediate section in an axial direction of the input shaft 3. The output section 13 comprises an output member 14 and a pair of output disks 15 supported respectively on the output member 14 so as to be integrally rotatable. One side surface of each of the output disks 15 is opposed to the track surface 5b of the input disk 5, and a concaved track surface 15b is formed on the one side surface. Further, a sprocket gear 14a meshed with a chain 16 for power transmission is formed on the outer periphery of the output member 14.

A toroidal cavity S1 is formed between the track surface 5b of each of the input disks 5 and the track surface 15b of the output disk 15 opposed thereto. In each of the toroidal cavities S1, e.g., three rollers 17 in a disk shape (only one roller is illustrated in FIG. 1), which rotate while coming into contact with each track surfaces 5b and 15b in a pressed state, are arranged.

The three rollers 17 are equally spaced apart from one another in a circumferential direction of both the disks 5 and 15 in the corresponding toroidal cavity S1. Consequently, a total of six rollers 17 are arranged in a pair of toroidal cavities S1. Each of the rollers 17 is supported so as to be rotatable around its axis of rotation 17a by a carriage 18. Further, a relative position between each of the rollers 17 and each of the track surfaces 5b and 15b can be adjusted as the carriage 18 is operated.

When hydraulic pressure serving as a end load is applied to the oil chamber 4 from the hydraulic control device 12 in the variator 1, the input disk 5 on the left side is biased rightward, and the output disk 15 on the left side is biased rightward through the rollers 17. Thus, the output disk 15 on the right side is biased rightward from the output disk 15 on the left side through the output member 14.

Furthermore, the input disk 5 on the right side is pressed from the output disk 15 on the right side through the roller 17. The input disk 5 is locked by the locking section 3b, so that the terminal load is applied to the whole variator 1. As a result, the roller 17 in each of the toroidal cavities S1 enters a state where the roller 17 is held between the corresponding disks 5 and 15 at predetermined pressure.

In this state, when power is applied to the input shaft 3, torque is transmitted to the output disk 15 from the input disk 5 through the six rollers 17. The roller 17 supported on the carriage 18 inclines an axis of rotation 17a of the roller 17 around the axis of the carriage 18 so as to produce a swing angle A1 in order that unbalance between a reaction force produced in the carriage 18 by transmitting the torque and torque required to drive the output disk 15 may be solved.

Thus, the position of the roller 17 is changed as indicated by a two-dot and dash line in the figure, so that a speed ratio between both the disks 5 and 15 is continuously changed. The respective three rollers 17 on either left and right are synchronized with each other so as to be bilaterally symmetrical to incline the axis of rotation 17a, and respective angles of inclination of all the six rollers coincide with one another.

Figure 2:
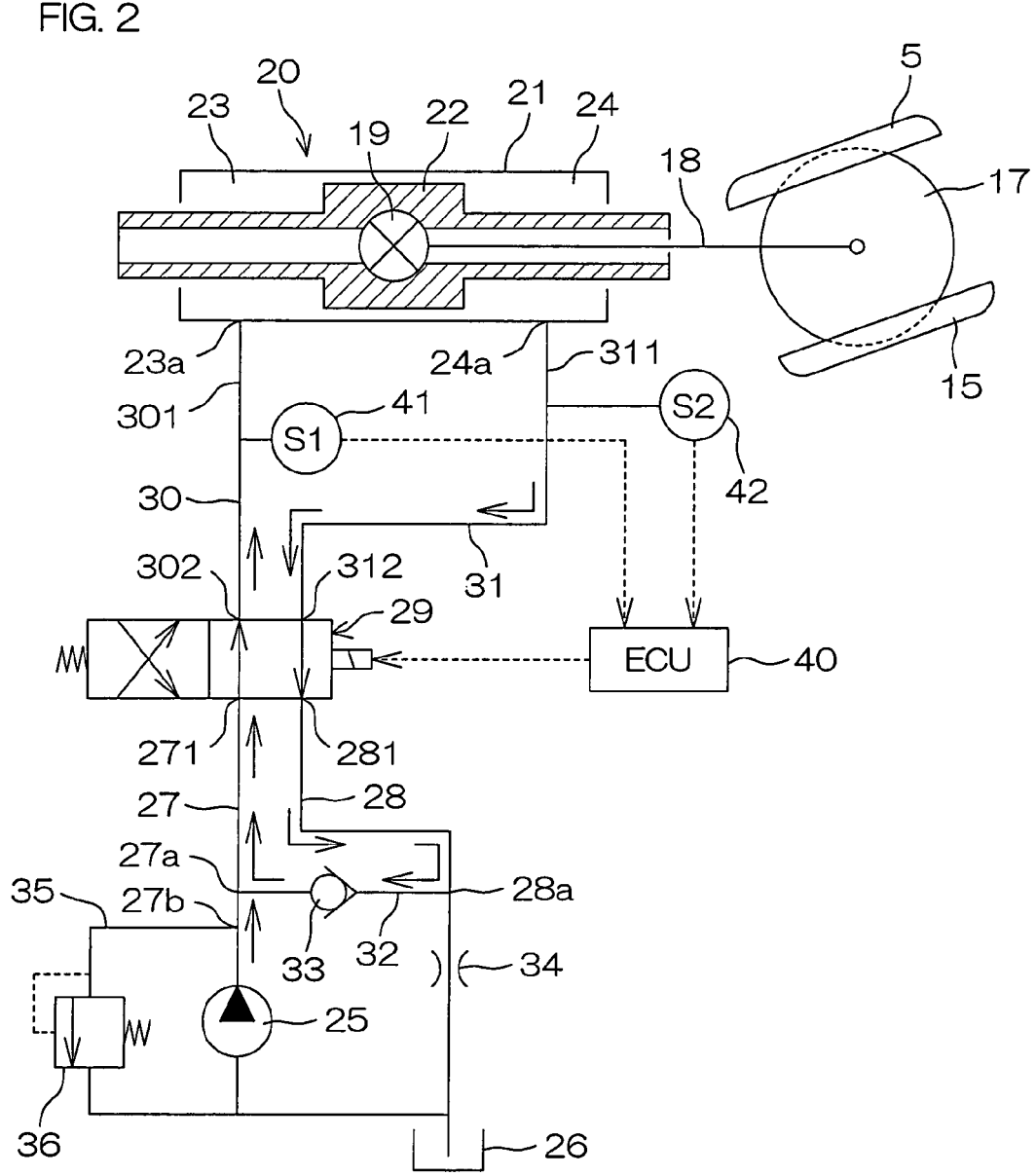
FIG. 2 is a schematic view showing the schematic configuration of a hydraulic circuit related to biasing of a roller, showing a case where hydraulic oil is discharged from a second oil chamber.

FIG. 2 is a schematic view showing a configuration related to the biasing of the roller 17 in the hydraulic control device 12. Although a hydraulic circuit configuration related to one of the rollers 17 is illustrated for simplicity of illustration, each of the rollers 17a is provided with a carriage 18, a joint 19, and a hydraulic circuit corresponding thereto.

Referring to FIG. 2, a hydraulic cylinder 20 serving as a hydraulic actuator functions to support the carriage 18 so as to be swingable around its axis and apply a pressing force against both the disks 5 and 15 to the rollers 17 through the carriage 18.

Specifically, the hydraulic cylinder 20 comprises a cylinder main body 21 in a cylindrical shape serving as a fixed section and a piston 22 serving as a movable section accommodated within the cylinder main body 21 so as to be slidable. The piston 22 partitions the cylinder main body 21 into first and second oil chambers 23 and 24 for producing the pressing force.

The joint 19 is composed of a spherical joint for connecting an end of the carriage 18 and the piston 22. The pressing force produced by the hydraulic cylinder 20 is transmitted to the roller 17 through the joint 19 and the carriage 18. That is, a driving force is applied in a forward direction or a backward direction to the carriage 18 by a difference between hydraulic pressures (a differential pressure) respectively fed into the first oil chamber 23 and the second oil chamber 24 in the hydraulic cylinder 20. The driving force is exerted as a force for pushing and pulling both the disks 5 and 15 (a pressing force) on the roller 17.

An electromagnetic proportion pressure reducing valve 29 (also referred to as an electromagnetic proportion directional control valve, which is a valve for pressure control and directional control) is provided between the first and second oil chambers 23 and 24 in the hydraulic cylinder 20 and a hydraulic pump 25 and an oil tank 26 that serve as a hydraulic pressure source. The electromagnetic proportion pressure reducing valve 29 alternatively connect a feeding path 27 from the hydraulic pump 25 and a discharge path 28 to the oil tank 26, respectively, to the first and second oil chambers 23 and 24 in the hydraulic cylinder 20, and controls hydraulic pressure in response to a control signal from a control section 40, described later.

Specifically, a first oil through port 23a opens in the first oil chamber 23, and a second oil through port 24a opens in the second oil chamber 24. There are provided a first oil through path 30 having one end 301 communicating with the first oil through port 23a and a second oil through path 31 having one end 311 communicating with the second oil through port 24a.

Figure 3:
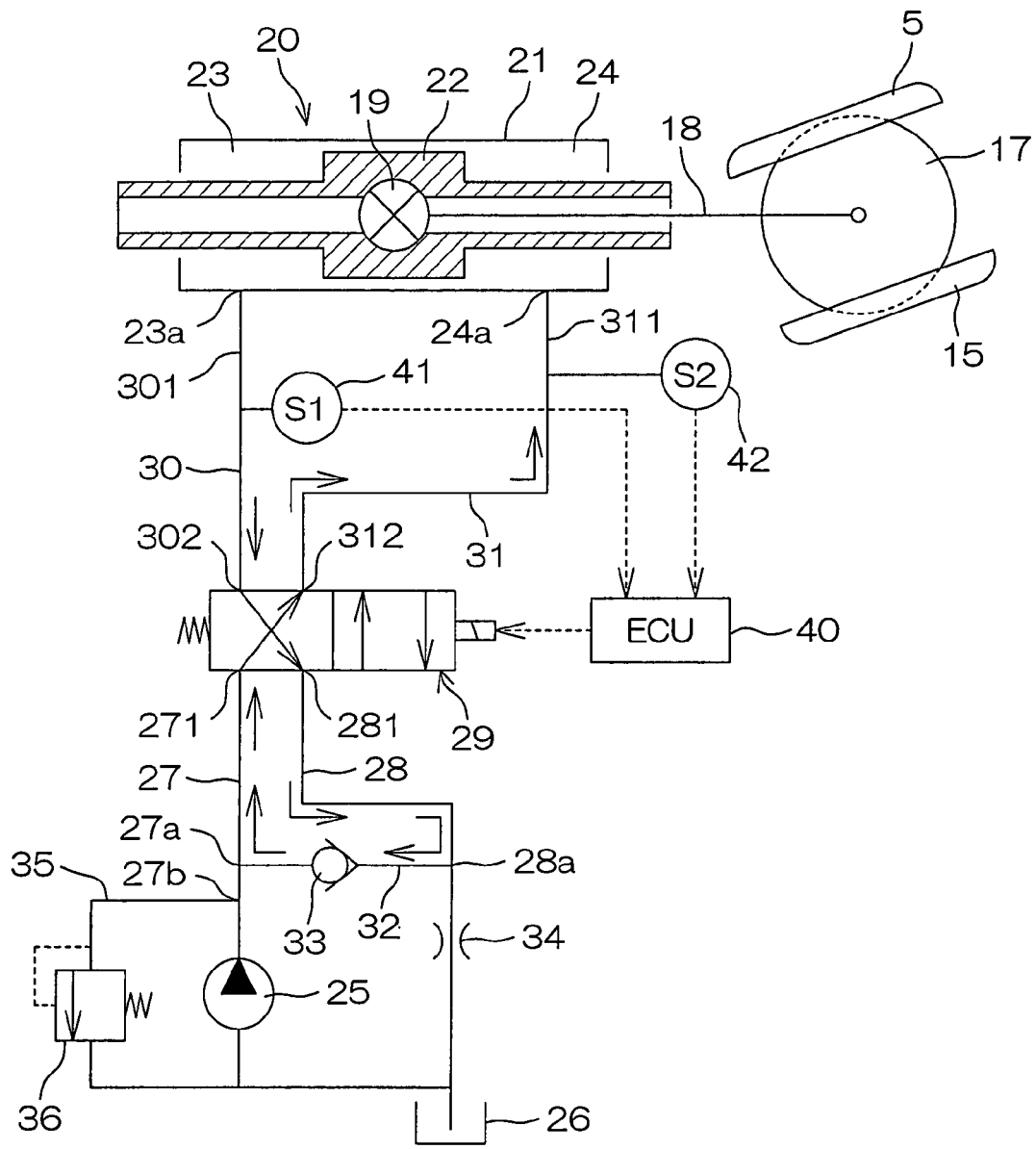
FIG. 3 is a schematic view showing the schematic configuration of a hydraulic circuit related to biasing of a roller, showing a case where hydraulic oil is discharged from a first oil chamber.

The electromagnetic proportion pressure reducing valve 29 is an electromagnetic valve for directional control for alternative switching into first and second states. In the first state attained by the electromagnetic proportion pressure reducing valve 29, the other end 302 of the first oil through path 30 and the other end 312 of the second oil through path 31 are respectively connected to one end 271 of the feeding path 27 and one end 281 of the discharge path 28, as shown in FIG. 2. In the second state attained by the electromagnetic proportion pressure reducing valve 29, the other end 302 of the first oil through path 30 and the other end 312 of the second oil through path 31 are respectively connected to the one end 281 of the discharge path 28 and the one end 271 of the feeding path 27, as shown in FIG. 3.

A first pressure sensor 41 is arranged in the first oil through paths 30, and a second pressure sensor 42 is arranged in the second oil through path 31.

There is provided a communication path 32 for connecting a connection section 27a serving as an intermediate section of the feeding path 27 and a connection section 28a serving as an intermediate section of the discharge path 28. A check valve 33 for allowing only the circulation of hydraulic oil to the feeding path 27 is arranged in the communication path 32.

The discharge path 28 has a flow restriction 34 provided in a portion on the downstream side of a connecting point 28a to the communication path 30.

The feeding path 27 is provided with a relief oil path 35 branched from a branching point 27b on the downstream side of a connecting point 27a to the communication path 32 to lead to the oil tank 26. A relief valve 36 is arranged in the relief oil path 35.

The electromagnetic proportion pressure reducing valve 29 is controlled by a command from the control section 40 composed of an electronic control unit (ECU). The electromagnetic proportion pressure reducing valve 29 is controlled to control the respective pressures of the first and second oil chambers 23 and 24, thereby allowing to apply a forward or backward driving force to the carriage 18.

In the control section 40, the most suitable differential pressure is applied between the oil chambers 23 and 24 on the basis of a detected temperature of traction oil and the swing angle A1 of the roller 17 (see FIG. 1, which corresponds to the angle of inclination) in addition pressures detected by the first and second pressure sensors 41 and 42, a load on a driving source of a vehicle, the number of revolutions of the driving source, and a final output speed, to always balance a traction force of the roller 17 and a driving force (a pressing force) of the carriage 18. Consequently, the production of a spin loss or a slip loss in the roller 17 can be restrained with a balance between the forces kept in the most suitable state.

According to the present embodiment, when the electromagnetic proportion pressure reducing valve 29 also for directional control is switched into a state where hydraulic oil is discharged from the second oil chamber 24, as shown in FIG. 2, hydraulic oil from the hydraulic pump 25 is fed into the first oil chamber 23 successively through the feeding path 27, the inner oil path in the electromagnetic proportion pressure reducing valve 29, and the first oil through path 30.

On the other hand, the hydraulic oil discharged from the second oil chamber 24 through the second oil through port 24a is fed into the first oil chamber 23 successively through the second oil through path 31, the other end 312 of the second oil through path 31, the inner oil path in the electromagnetic proportion pressure reducing valve 29, the one end 281 of the discharge path 28, the discharge path 28, (connecting point 28*a*), the communication path 32 through the check valve 33, (connecting point 27*a*), the feeding path 27, the one end 271 of the feeding path 27, the inner oil path in the electromagnetic proportion pressure reducing valve 29, the other end 302 of the first oil through path 30, and the first oil through path 30.

When the electromagnetic proportion pressure reducing valve 29 also for directional control is switched into a state where hydraulic oil is discharged from the first oil chamber 23, as shown in FIG. 3, hydraulic oil from the hydraulic pump 25 is fed into the second oil chamber 24 successively through the feeding path 27, the inner oil path in the electromagnetic proportion pressure reducing valve 29, and the second oil through path 31.

On the other hand, the hydraulic oil discharged from the first oil chamber 23 through the first oil through port 24*a* is fed into the second oil chamber 24 successively through the first, oil through path 30, the other end 302 of the first oil through path 30, the inner oil path in the electromagnetic proportion pressure reducing valve 29, the one end 281 of the discharge path 28, the discharge path 28, (connecting point 28*a*), the communication path 32 through the check valve 33, (connecting point 27*a*), the feeding path 27, the one end 271 of the feeding path 27, the inner oil path in the electromagnetic proportion pressure reducing valve 29, the other end 312 of the second oil through path 31, and the second oil through path 31.

Since the hydraulic oil discharged from the oil chamber on the discharge side can be thus fed into the oil chamber on the feeding side, the pressure of the oil chamber on the feeding side can be quickly raised. Consequently, a biasing force of the roller 17 can be instantaneously adjusted. As a result, the transmission ratio can be changed as quickly as possible.

The hydraulic pump 25 for feeding hydraulic oil can be miniaturized, and thus the full-toroidal continuously variable transmission can be miniaturized. Further, the pressure of hydraulic oil in a portion of the discharge path 28 positioned on the upstream side of the flow restriction 34 can be increased, so that the hydraulic oil can be amply fed into the feeding path 27 from the discharge path 28 through the communication path 32.

Figure 4:
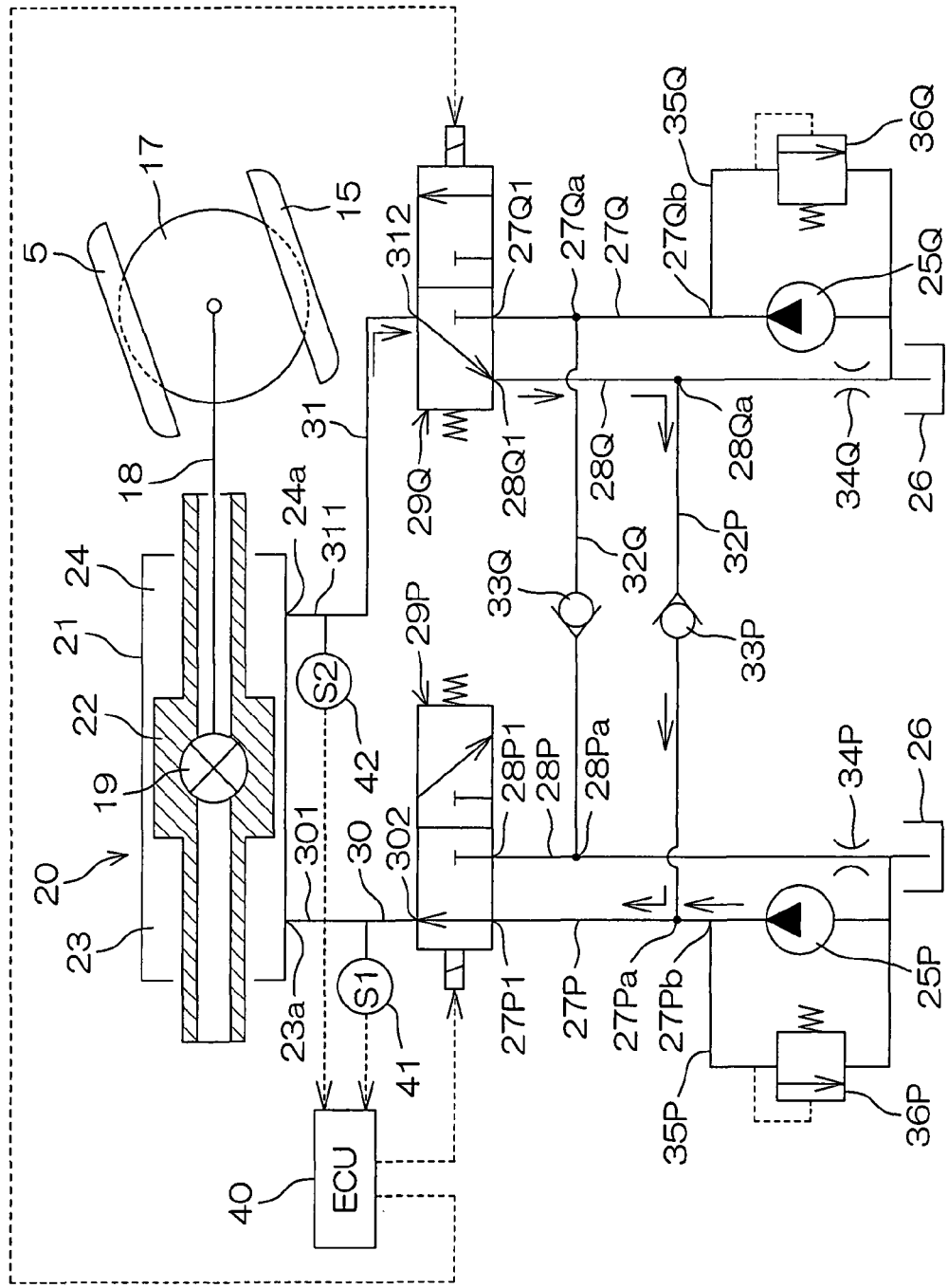
FIG. 4 is a schematic view showing the schematic configuration of a hydraulic circuit related to biasing of a roller in another embodiment of the present invention, showing a case where hydraulic oil is discharged from a second oil chamber.
Figure 5:
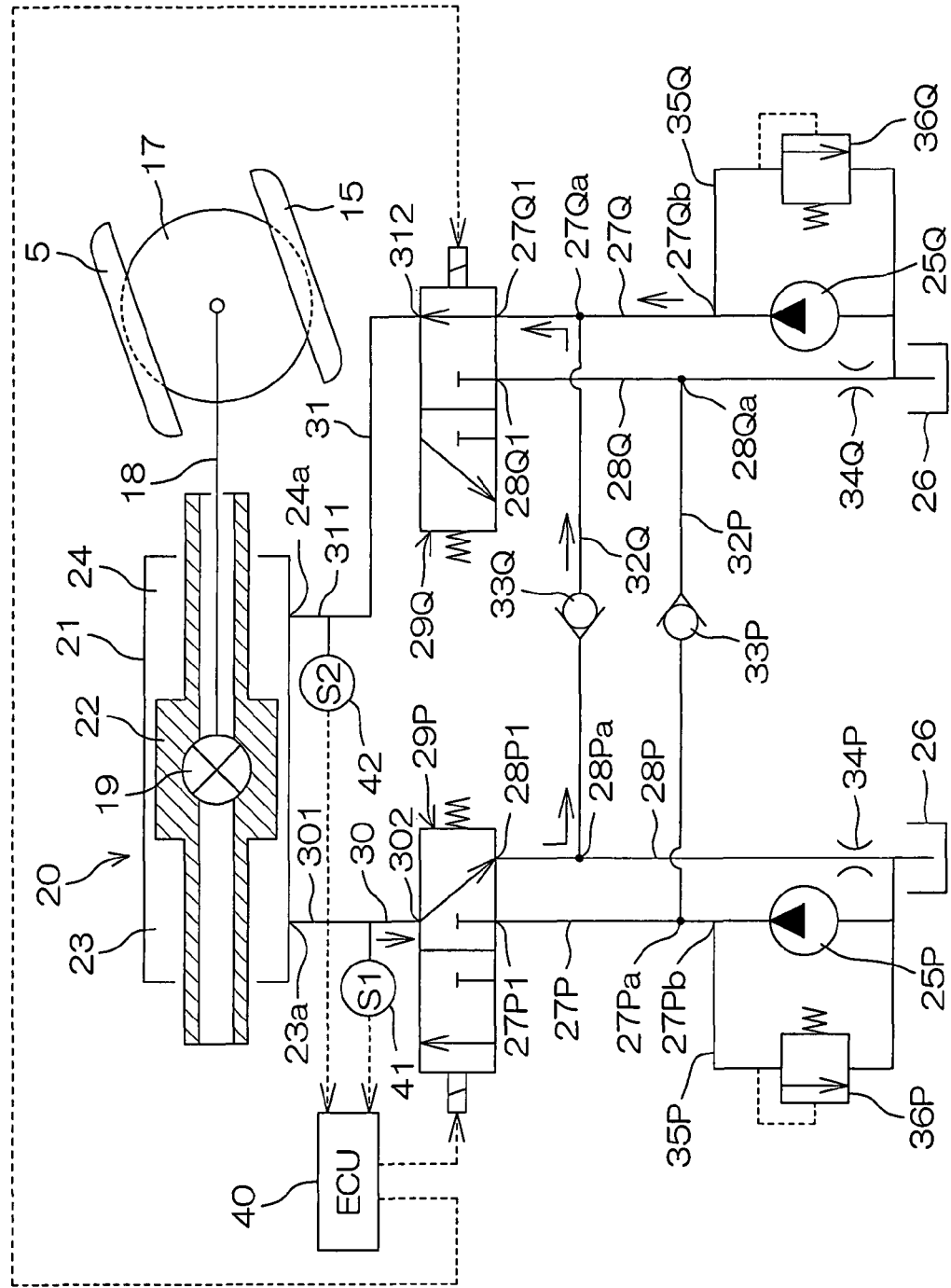
FIG. 5 is a schematic view showing the schematic configuration of a hydraulic circuit related to biasing of a roller in the embodiment shown in FIG. 4, showing a case where hydraulic oil is discharged from a first oil chamber.

The feeding path 27 and the discharge path 28 can be shared between both the oil chambers 23 and 24. Moreover, the use of a single electromagnetic proportion pressure reducing valve (electromagnetic proportion directional control valve) 29 allows switching between connections of the feeding path 27 and the discharge path 28 to each of the oil chambers 23 and 24 to simplify the configuration. Then, FIGS. 4 and 5 illustrate another embodiment of the present invention. The present embodiment differs from the embodiment shown in FIG. 2 in the following. That is, a first feeding path 27P, a first discharge path 28P, a first electromagnetic proportion pressure reducing valve 29P, a first flow restriction 34P, a first hydraulic pump 25P serving as a first hydraulic pressure source, a first relief path 35P, and a first relief valve 36P are provided in correspondence with a first oil chamber 23 in a hydraulic cylinder 20. Further, a second feeding path 27Q, a second discharge path 28Q, a second electromagnetic proportion pressure reducing valve 29Q, a second flow restriction 34Q, a second hydraulic pump 25Q serving as a second hydraulic pressure source, a second relief path 35Q, and a first relief valve 36Q are provided in correspondence with a second oil chamber 24.

There is provided a first communication path 32P for connecting a connecting point 27Pa serving as an intermediate section of the first feeding path 27P and a connecting point 28Qa serving as an intermediate section of the second discharge path 28Q. The first communication path 32P is provided with a first check valve 33P for allowing only the circulation of hydraulic oil toward the first feeding path 27P. Further, there is provided a second communication path 32Q for connecting a connecting point 27Qa serving as an intermediate section of the second feeding path 27Q and a connecting point 27Pa serving as an intermediate section of the first discharge path 27P. The second communication path 32Q is provided with a second check valve 33Q for allowing only the circulation of hydraulic oil toward the second feeding path 27Q.

The first electromagnetic proportion pressure reducing valve 29P is composed of an electromagnetic valve also for directional control of alternative switching into a first state where the other end 302 of the first oil through path 30 is connected to one end 27P1 of the first feeding path 27P (see FIG. 4) to a second state where the other end 302 is connected to one end 28P1 of the first discharge path 28P (see FIG. 5).

The second electromagnetic proportion pressure reducing valve 29Q is composed of an electromagnetic valve also for directional control of alternative switching into a first state where the other end 312 of the second oil through path 31 is connected to one end 28Q1 of the second discharge path 28Q (see FIG. 4) to a second state where the other end 312 is connected to one end 27Q1 of the second feeding path 27Q (see FIG. 5).

According to the present embodiment, in a state where both the first and second electromagnetic proportion pressure reducing valves 29P and 29Q are respectively switched into the first states, as shown in FIG. 4, that is, in a case where the second oil chamber 24 is an oil chamber on the discharge side, hydraulic oil from the first hydraulic pump 25P is fed into the first oil chamber 23 successively through the first feeding path 27P, an internal oil path in the first electromagnetic proportion pressure reducing valve 29P, and the first oil through path 30.

On the other hand, hydraulic oil discharged from the second oil chamber 24 through a second oil through port 24*a* is fed into the first oil chamber 23 successively through the second oil through path 31, the other end 312 of the second oil through path 31, an internal oil path in the second electromagnetic proportion pressure reducing valve 29Q, the one end 28Q1 of the second discharge path 28Q, the second discharge path 28Q, (connecting point 28Qa), the first communication path 32P through the first check valve 33P, (connecting point 27Pa), the first feeding path 27P, the one end 27P1 of the first feeding path 27P, the internal oil path in the first electromagnetic proportion pressure reducing valve 29P, the other end 302 of the first oil through path 30, and the first oil through path 30.

In a state where both the first and second electromagnetic proportion pressure reducing valves 29P and 29Q are respectively switched into the second states, as shown in FIG. 5, that is, in a case where the first oil chamber 23 is an oil chamber on the discharge side, hydraulic oil from the second hydraulic pump 25Q is fed into the second oil chamber successively through the second feeding path 27Q, the internal oil path in the second electromagnetic proportion pressure reducing valve 29Q, and the second oil through path 31.

On the other hand, hydraulic oil discharged from the first oil chamber 23 through a first oil through port 23*a* is fed into the second oil chamber 24 successively through the first oil through path 30, the other end 302 of the first oil through path 30, the internal oil path in the first electromagnetic proportion pressure reducing valve 29P, the one end 28P1 of the first discharge path 28P, the first discharge path 28P, (connecting point 28Pa), the second communication path 32Q through the second check valve 33Q, (connecting point 27Qa), the second feeding path 27Q, the one end 27Q1 of the second feeding path 27Q, the internal oil path in the second electromagnetic proportion pressure reducing valve 29Q, the other end 312 of the second oil through path 31, and the second oil through path 31.

As in the present embodiment, the hydraulic oil discharged from the oil chamber on the discharge side is fed into the oil chamber on the feeding side. Therefore, the pressure of the oil chamber on the feeding side can be quickly raised. Consequently, a biasing force of the roller 17 can be instantaneously adjusted. As a result, the transmission ratio can be changed as quickly as possible. The hydraulic pump 25 for feeding hydraulic oil can be miniaturized, and thus the full-toroidal continuously variable transmission can be miniaturized. Further, the pressures of hydraulic oil in portions of the respective discharge paths 28P and 28Q positioned on the upstream side of the flow restrictions 34P and 34Q can be increased, so that the hydraulic oil can be amply fed from the respective discharge paths 28P and 28Q into the corresponding feeding paths 27P and 27Q through the corresponding communication paths 32P and 32Q.

There may be provided an oil path for introducing the hydraulic oil in the second feeding path 27Q into the oil chamber 4 for biasing the input and output disks 5 and 15 in a direction adjacent to each other.

Figure 6:
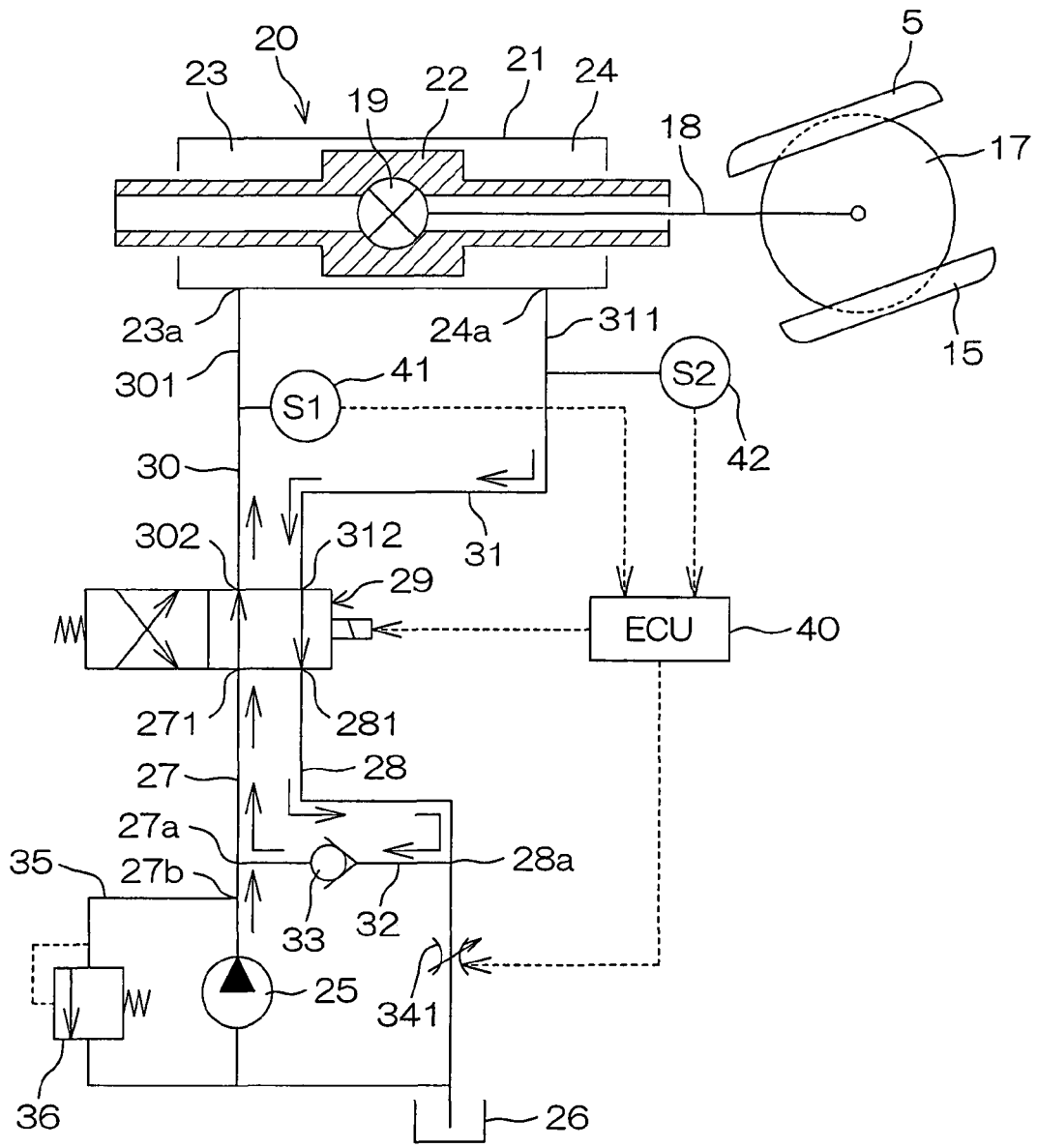
FIG. 6 is a schematic view showing the schematic configuration of a hydraulic circuit in a full-toroidal continuously variable transmission in still another embodiment of the present invention.

The flow restriction 34 in the embodiment shown in FIG. 2 may be replaced with a variable flow restriction 341, as shown in FIG. 6. The variable flow restriction 341 and the check valve 33 may be suitably controlled by a control section 40. The valves may be contained in a pressure control valve and a flow control valve.

Figure 7:
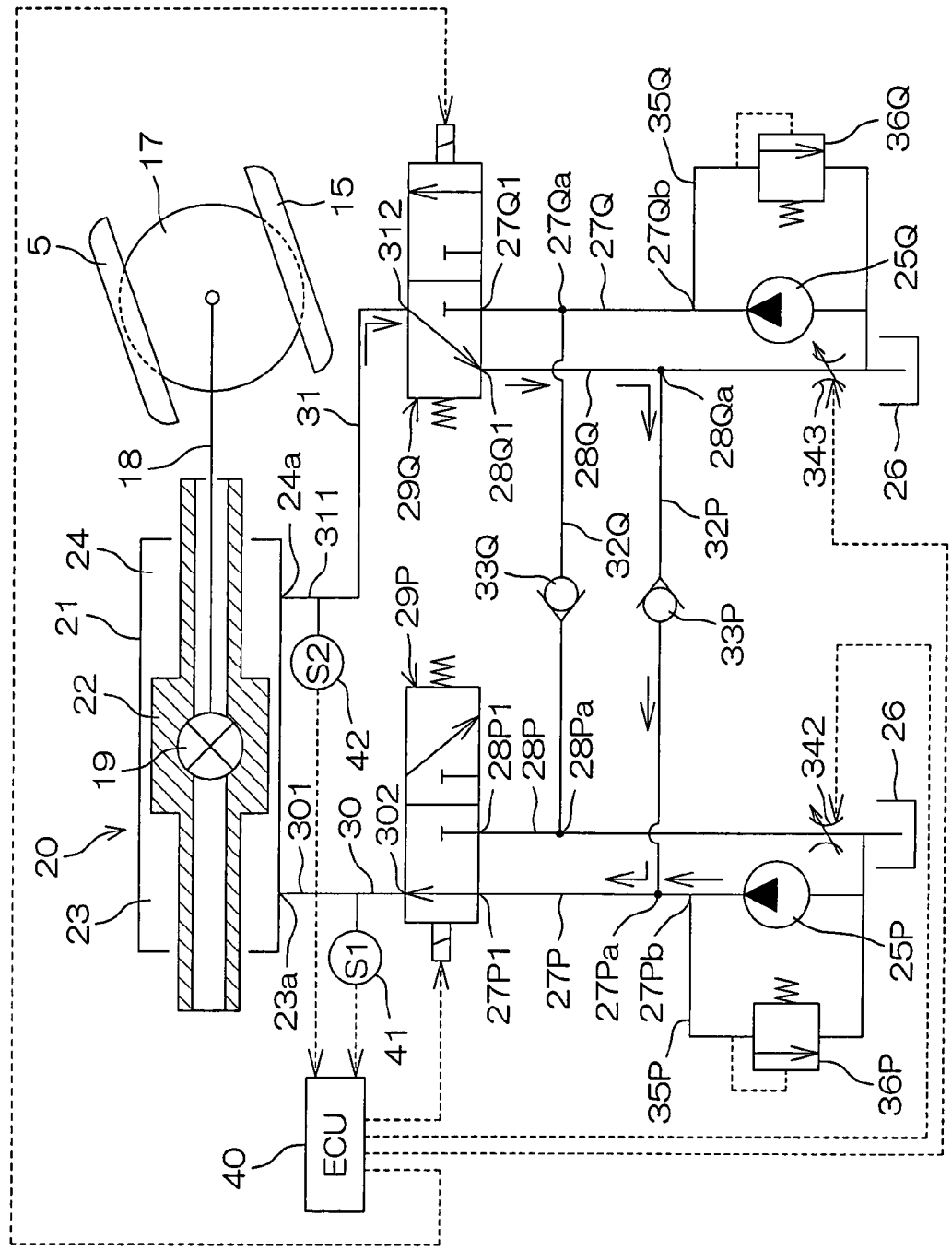
FIG. 7 is a schematic view showing the schematic configuration of a hydraulic circuit in a full-toroidal continuously variable transmission in a further another embodiment of the present invention.

The flow restrictions 34P and 34Q in the embodiment shown in FIG. 4 may be replaced with variable flow restrictions 342 and 343, as shown in FIG. 7. The variable flow restrictions 342 and 343 and the check valves 33P and 33Q may be suitably controlled by the control section 40. The valves may be contained in a pressure control valve and a flow control valve.

Furthermore, a piston 22 and a cylinder main body 21 may be a fixed section and a movable section, respectively to connect a carriage 18 to the cylinder main body 21 through a joint 19.

While specific embodiments of the present invention have been described in detail above, it is to be understood that variations, modifications, and equivalents will be apparent to those skilled in the art who have understood the foregoing contents. The scope of the present invention, therefore, is to be determined by the following claims and their equivalents.

The present application corresponds to Application No. 2005-132607 filed with the Japanese Patent Office on Apr. 28, 2005, the disclosure of which is hereinto incorporated by reference.

What is claimed is:

1. A full-toroidal continuously variable transmission, comprising:
    a pair of disks opposed to each other;
    a roller arranged in a toroidal cavity formed between the disks for transmitting torque between the disks;
    a carriage for rotatably supporting the roller;
    a hydraulic actuator for applying a pressing force against the pair of disks to the roller through the carriage; and
    a hydraulic circuit connected to the hydraulic actuator,
    the hydraulic actuator comprising first and second oil chambers, the pressing force being produced by a difference in pressure between the first and second oil chambers,
    the hydraulic circuit comprising
    at least one feeding path communicating with a hydraulic pressure source, and including first and second feeding paths corresponding respectively to the first and second oil chambers,
    at least one discharge path communicating with an oil tank, and including first and second discharge paths corresponding respectively to the first and second oil chambers,
    at least one communication path for communicating intermediate sections of the feeding path and the discharge path that correspond to each other, and including a first communication path for connecting an intermediate section of the first feeding path to an intermediate section of the second discharge path, and a second communication path for connecting an intermediate section of the second feeding path to an intermediate section of the first discharge path,
    at least one directional control valve for alternatively switching a first state where the first oil chamber and the second oil chamber are respectively connected to the feeding path and the discharge path and a second state where the first oil chamber and the second oil chamber are respectively connected to the discharge path and the feeding path, and including a first directional control valve for alternatively connecting the first oil chamber to either one of the first feeding path and the first discharge path, and a second directional control valve for alternatively connecting the second oil chamber to either one of the second feeding path and the second discharge path,
    at least one check valve arranged in the communication path for allowing only a circulation of hydraulic oil to the corresponding feeding path, and including a first check valve provided in the first communication path for allowing only a circulation of hydraulic oil to the first feeding path, and a second check valve provided in the second communication path for allowing only a circulation of hydraulic oil to the second feeding path, and
    at least one flow restriction provided in the discharge path, the flow restriction being arranged on a downstream side of the intermediate section of the discharge path, and including a first flow restriction provided in the first discharge path, and a second flow restriction provided in the second flow restriction,
    the first flow restriction being arranged on a downstream side of the intermediate section of the first discharge path, and
    the second flow restriction being arranged on a downstream side of the intermediate section of the second discharge path.

2. The full-toroidal continuously variable transmission according to claim 1, wherein the hydraulic pressure source includes a first hydraulic pressure source for feeding hydraulic pressure to the first feeding path and a second hydraulic pressure source for feeding hydraulic pressure to the first hydraulic pressure source.

3. The full-toroidal continuously variable transmission according to claim 1, wherein the directional control valve includes an electromagnetic valve having a pressure reducing function, the electromagnetic valve being controlled by a control section.

4. The full-toroidal continuously variable transmission according to claim 1, wherein the flow restriction includes a variable flow restriction.

5. The full-toroidal continuously variable transmission according to claim 4, wherein the variable flow restriction includes an electromagnetic valve controlled by a control section.

* * * * *